2,934,525

ACRYLYLOXY TRIAZINES, METHOD OF MAKING SAME, AND POLYMERIZATION PRODUCTS THEREFROM

Frank Fekete, Tonawanda, N.Y., assignor to Pittsburgh Plate Glass Company, Allegheny County, Pa., a corporation of Pennsylvania No Drawing. Application March 21, 1956
Serial No. 572,796

12 Claims. (Cl. 260—88.1)

This invention relates to novel chemical compounds and to a method for preparing them, and pertains more specifically to the reaction of cyanuric halides with salts of unsaturated monocarboxylic acids whereby the unsaturated acid is coupled to the triazine ring of the cyanuric halide.

Cyanuric chloride, which possess the structure

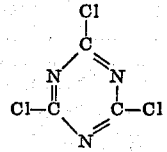

is a yellow to off-white, pungent solid having a melting point of 145.7° C. and a specific gravity of 1.32. It has now been discovered that cyanuric chloride, as well as other cyanuric halides, reacts readily with the alkali metal salts of unsaturated monocarboxylic acids, and particularly acrylic acid or methacrylic acid, to give novel chemical compounds in which the alkali metal atom reacts with the halogen atom of the cyanuric halide to form an inorganic metal salt, with the residue of the unsaturated monocarboxylic acid attaching to the carbon atom from which the halogen atoms are removed. The reaction is believed to proceed substantially as follows, wherein cyanuric chloride and potassium methacrylate are utilized for illustrative purposes:

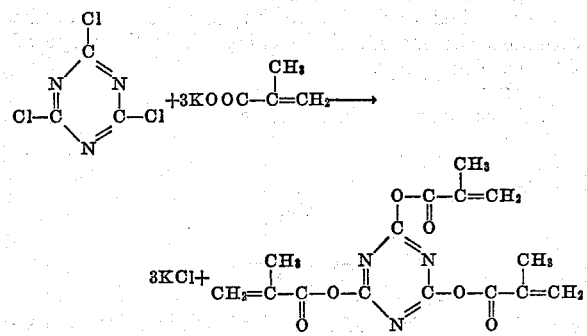

The product of the reaction depicted above, as well as the products obtained when salts of other unsaturated monocarboxylic acids are substituted for potassium methacrylate, homopolymerize readily, or interpolymerize with other monomers or unsaturated polyesters to give hard, clear polymers having excellent heat resistance and many other useful properties.

The novel compounds prepared by reacting cyanuric halides with alkali metal salts of unsaturated monocarboxylic acids possess the following structure:

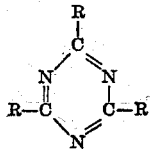

wherein each R is the radical derived by removing the carboxyl hydrogen atom from an unsaturated monocarboxylic acid such as methacrylic acid or acrylic acid. Obviously, the three R radicals need not be the same, but may actually be derived from different acids.

Any unsaturated monocarboxylic acid may be utilized in the reaction with cyanuric halides in accordance with the reaction set forth hereinabove. As indicated, acrylic acid and methacrylic acid are particularly preferred, primarily because they both are available at relatively low cost. However, other unsaturated monocarboxylic acids may also be utilized, such acids including crotonic acid, oleic acid, and the like. Preferably, the acid is utilized in the form of an alkali metal salt, such as the sodium or potassium salts. However, the reaction also takes place when the free acid is utilized, although only with difficulty and not to the extent that it does when the acid salt is employed.

Since the cyanuric halides are generally solids, it is desirable that the reaction be carried out in a solvent utilized in an amount such as to provide a readily stirrable reaction mixture. Suitable solvents include the alcohols such as methyl or ethyl alcohol and the like, or more active solvents such as dimethyl formamide or dimethyl sulfoxide. No catalyst is necessary since the reaction takes place rapidly and exothermally when the reactants are brought together at room temperature. Very high temperatures are to be avoided since excessive polymerization of the unsaturated acid or the product may take place. It is desirable that a polymerization inhibitor be included in the reaction mixture in order to prevent substantial polymerization of the unsaturated monocarboxylic acid and/or the polymerizable product. Suitable inhibitors for this purpose include hydroquinone, pyrogallol, tertiary butyl catechol, and the like.

As indicated hereinabove, three moles of the unsaturated monocarboxylic acid are required stoichiometrically to react with one mole of the cyanuric halide. It will be noted, however, that the cyanuric halide has three reactive positions, namely, the three chlorine atoms, so that some quantity of the mono- or di-substituted compound may also be obtained, although the tri-substituted compound is normally the major product. The reaction may also be carried out utilizing less than three moles of acid per mole of the cyanuric halide, or by utilizing a large excess of the acid salt, although no particular advantage is obtained when other than substantially stoichiometric quantities are employed.

As the reaction proceeds, the inorganic salt forms and generally precipitates from the reaction mixture. The desired product can be recovered readily by first filtering off the inorganic salt, and removing the solvent by evaporation or distillation, or by adding a solvent such as toluene or the like in which the product is soluble. The product layer can be decanted and the toluene or other solvent containing the product is removed by evaporation or a simple distillation to give the final product, ordinarily as a light tan solid. Other conventional means for recovering the product from the reaction mixture may also be used.

The monomeric compounds obtained by this process polymerize readily in the presence of a small quantity of a catalyst such as a peroxygen compound to give homopolymers which are hard and strong, and which, as indicated hereinabove, posses unusually good heat resistance. In a similar manner, these monomers can be admixed with other monomeric materials in the presence of catalyst and heated to give interpolymers which possess many useful properties including the excellent heat resistance of the homopolymers.

Among the monomers which can be polymerized with compounds such as the novel triacryloxy or trimethacrylyloxy s-triazines of this invention are the following: methyl acrylate, ethyl acrylate, butyl acrylate, isobutyl acrylate, hexyl acrylate, octyl acrylate, styrene, vinyl toluene, maleate esters such as dibutyl maleate, acidic materials such as acrylic acid, methacrylic acid, maleic anhydride, vinyl ethers, vinyl ketones, vinyl pyridines, allyl acetoacetates, glycidyl acrylates, methacrylamide, dimethylbenzyl methacrylate, durenediol dimethacrylate, diallylidene pentaerythritol, and the like.

Included among the catalysts which may be utilized to prepare either the homopolymers or interpolymers containing the novel monomers of this invention are the following: acetylbenzoyl peroxide, hydroxyheptyl peroxide, benzoyl peroxide, methyl ethyl ketone peroxide, cyclohexanone peroxide, cyclohexyl hydroperoxide, 2,4-dichlorobenzoyl peroxide, t-butyl hydroperoxide, methyl amyl ketone peroxide, acetyl peroxide, lauroyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, p-butyl peracetate and the like. The diazo compounds, such as p-methoxyphenyl diazo-thio-2-(naphthyl) ether may also be used as polymerization catalysts, as may actinic light. Redox catalyst systems can also be employed. The quantity of catalyst utilized can be varied considerably; however, in most instances it is desirable to utilize from about 0.1 percent to about 2.0 percent based on the total monomer weight.

The polymerization can be carried out in mass, that is, simply by heating the monomer or monomers in the presence of a catalyst, or if desired, the polymerization can be conducted in a solvent for the monomer or monomers, or in an aqueous emulsion. Chain modifying agents or chain terminators such as the mercaptans, and particularly dodecyl mercaptan, and other additives conventionally utilized in polymerization reactions can be employed.

The following examples illustrate in detail the preparation of novel monomers by the reaction of cyanuric halides with unsaturated acids or salts thereof, and the polymerization of such monomers to form homopolymers and interpolymers. The examples are not intended to limit the invention, however, for there are, of course, numerous possible variations and modifications.

*Example I*

Three hundred thirty three grams (3 moles) of potassium methacrylate and 184 grams (1 mole) of cyanuric chloride were admixed in a sufficient amount of ethyl alcohol to provide easily stirrable mixture. One percent by weight of hydroquinone was added to prevent polymerization of the potassium methacrylate. As stirring proceeded an immediate reaction was seen to occur, with considerable evolution of heat and deposition of potassium chloride. The heat reaction eventually reached the boiling point of ethyl alcohol and the reaction mixture began to reflux. After 15 minutes the mixture was cooled and the potassium chloride removed by filtering. A quantitative yield of the potassium chloride was formed, indicating complete coupling of the acid residue with the triazine ring of the cyanuric chloride. The ethyl alcohol was removed by vacuum evaporation leaving a light tan solid which was characterized by nitrogen analysis as being trimethacrylyloxy s-triazine of the structure

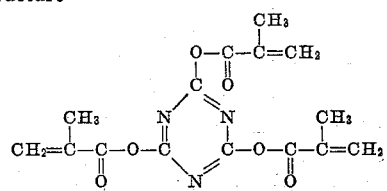

The yield was approximately 55 percent.

*Example II*

Example I is repeated substituting 330 grams of potassium acrylate for the potassium methacrylate of the previous example. A good yield of triacrylyloxy s-triazine was obtained.

*Example III*

One hundred eighty eight grams of potassium methacrylate and 92.2 grams of cyanuric chloride were admixed with 5 grams of hydroquinone in sufficient dimethyl formamide to give a readily stirrable mixture. As the mixture was stirred the temperature gradually was raised to 100° C. over a period of approximately an hour. It was then heated to reflux for an additional 15 minutes, the potassium chloride precipitating rapidly. After cooling, the salt was separated by filtering. A quantitative yield of the salt was obtained, indicating complete coupling of the reactants. Toluene was added to the dimethyl formamide-product solution, and the supernatant product was decanted. One hundred grams of dimethylacrylyloxy s-triazine was recovered by evaporation of the toluene followed by purification.

*Example IV*

The product of Example III was heated in the presence of 0.10 percent by weight of benzoyl peroxide, and was observed to polymerize to a hard, clear solid in approximately 5 minutes. The heat resistance of the resulting polymer was outstanding.

*Example V*

The product of Example III was admixed with an equal amount of a propylene maleate polyester and the mixture heated in the presence of 0.10 percent by weight of cumene hydroperoxide, whereupon a hard, clear, heat-resistant interpolymer was obtained. The interpolymer is useful in applications where excellent heat resistance is necessary.

When the above examples are repeated utilizing other unsaturated acids or acid salts, generally equivalent results are obtained. For example, when free acrylic acid is substituted for the potassium acrylate in Example II, a good yield of triacrylyloxy s-triazine is obtained.

Although specific examples of the invention have been set forth hereinabove, it is not intended that the invention be limited solely thereto, but to include all of the variations and modifications falling within the scope of the appended claims.

I claim:

1. A compound of the structure

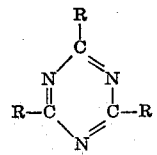

wherein each R is a radical derived by removing the carboxyl hydrogen atom from a monoethylenically unsaturated monocarboxylic acid containing from 3 to 18 carbon atoms.

2. The compound of claim 1 wherein each R represents the radical derived by removing the carboxyl hydrogen atom from methacrylic acid.

3. The compound of claim 1 wherein each R represents the radical derived by removing the carboxyl hydrogen atom from acrylic acid.

4. An interpolymer of a compound of the structure

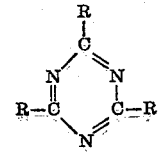

wherein each R is the radical derived by removing the carboxyl hydrogen atom from a monoethylenically unsaturated monocarboxylic acid containing from 3 to 18 carbon atoms, and at least one other polymerizable monomeric compound containing a $CH_2=C<$ group.

5. A copolymer of trimethacrylyloxy s-triazine and styrene.

6. A homopolymer of trimethacrylyloxy s-triazine.

7. The method of preparing a compound of the structure

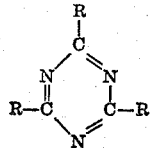

wherein each R is the radical derived by removing the carboxyl hydrogen atom from a monoethylenically unsaturated monocarboxylic acid containing from 3 to 18 carbon atoms, which comprises reacting a cyanuric halide with an alkali metal salt of said unsaturated monocarboxylic acid.

8. The method of claim 7 wherein each R represents a methacrylyloxy radical, and the unsaturated monocarboxylic acid is methacrylic acid.

9. The method of claim 8 wherein the cyanuric halide is cyanuric chloride.

10. The method which comprises reacting cyanuric chloride with an alkali metal salt of methacrylic acid in a solvent for the reactants, whereupon chemical reaction occurs to form as a predominant product, trimethacrylyloxy s-triazine.

11. A homopolymer of a compound of the structure

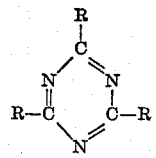

wherein each R is a radical derived by removing the carboxyl hydrogen atom from a monoethylenically unsaturated monocarboxylic acid containing from 3 to 18 carbon atoms.

12. A polymer selected from the group consisting of (1) homopolymers of a compound of the structure

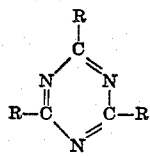

where each R is a radical derived by removing the carboxyl hydrogen atom from a monoethylenically unsaturated monocarboxylic acid containing from 3 to 18 carbon atoms, and (2) interpolymers of a compound (1) of the said structure and at least one other polymerizable monomeric compound containing a $CH_2=C<$ group.

References Cited in the file of this patent

UNITED STATES PATENTS

| | | |
|---|---|---|
| 2,510,503 | Kropa | June 6, 1950 |
| 2,559,694 | Zerner et al. | July 10, 1951 |
| 2,568,620 | Gresham et al. | Sept. 18, 1951 |
| 2,643,990 | Ham | June 30, 1953 |